(12) United States Patent
Lottes et al.

(10) Patent No.: US 9,891,949 B2
(45) Date of Patent: Feb. 13, 2018

(54) SYSTEM AND METHOD FOR RUNTIME SCHEDULING OF GPU TASKS

(71) Applicant: NVIDIA Corporation, Santa Clara, CA (US)

(72) Inventors: Timothy Paul Lottes, Milpitas, CA (US); Daniel Wexler, Soda Springs, CA (US); Craig Duttweiler, San Carlos, CA (US); Sean Treichler, Sunnyvale, CA (US); Luke Durant, Santa Clara, CA (US); Philip Cuadra, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/787,660

(22) Filed: Mar. 6, 2013

(65) Prior Publication Data
US 2014/0259016 A1 Sep. 11, 2014

(51) Int. Cl.
G06F 9/30 (2006.01)
G06F 9/38 (2006.01)
G06F 9/48 (2006.01)

(52) U.S. Cl.
CPC ...... *G06F 9/4881* (2013.01); *G06F 2209/484* (2013.01)

(58) Field of Classification Search
CPC ............. G06F 9/30; G06F 9/38; G06F 9/5038
USPC ........................................................ 345/501
See application file for complete search history.

(56) References Cited

U.S. PATENT DOCUMENTS

| | | | |
|---|---|---|---|
| 4,807,111 A | 2/1989 | Cohen et al. | |
| 6,330,583 B1 * | 12/2001 | Reiffin | 718/105 |
| 6,647,456 B1 | 11/2003 | Van Dyke et al. | |
| 7,376,803 B1 | 5/2008 | Eckert | |
| 7,617,368 B2 | 11/2009 | Van Dyke et al. | |
| 2003/0065843 A1 | 4/2003 | Jones et al. | |
| 2003/0067832 A1 | 4/2003 | Emmot et al. | |
| 2004/0268355 A1 * | 12/2004 | Robin et al. | 718/100 |
| 2006/0288346 A1 * | 12/2006 | Santos et al. | 718/102 |
| 2009/0228663 A1 | 9/2009 | Ichino | |
| 2011/0212761 A1 * | 9/2011 | Paulsen | G06T 15/005 463/25 |

* cited by examiner

*Primary Examiner* — Barry Drennan
*Assistant Examiner* — Shivang Patel

(57) ABSTRACT

A method for scheduling work for processing by a GPU is disclosed. The method includes accessing a work completion data structure and accessing a work tracking data structure. Dependency logic analysis is then performed using work completion data and work tracking data. Work items that have dependencies are then launched into the GPU by using a software work item launch interface.

26 Claims, 4 Drawing Sheets

SYSTEM AND METHOD FOR RUNTIME SCHEDULING OF GPU TASKS

FIELD OF THE INVENTION

The present invention is generally related to computer systems.

BACKGROUND OF THE INVENTION

Modern GPUs are massively parallel processors emphasizing parallel throughput over single-thread latency. Graphics shaders read the majority of their global data from textures and general-purpose applications written for the GPU also generally read significant amounts of data from global memory. These accesses are long latency operations, typically hundreds of clock cycles.

It should be noted that there exist hierarchies of scheduling on the GPU. The work scheduling encompasses both the scheduling of the tasks themselves and the scheduling of the threads on the execution units. Modern GPUs deal with the long latencies (e.g., of texture accesses, etc.) by having a large number of threads active concurrently. They can switch between threads on a cycle-by-cycle basis, covering the stall time of one thread with computation from another thread. To support this large number of threads, GPUs must have efficient work scheduling.

In one instance of the prior art, the GPU signals the CPU to generate work, the CPU writes commands to start work in a command stream (e.g., a push buffer), and then the GPU reads the command stream and begins to execute the commands. This method of work creation involves a high amount of latency and requires the hardware to resolve all dependencies according to a pre-encoded scheme (e.g., hardware semaphore acquire and release methods encoded into the push buffer).

Modern GPUs may include work creation features that solve many of the problems with latency, performance, and the limited amount of work creation possible. However, they do not solve the problem of resolving work dependencies. All dependencies either need to be resolved via hardware semaphore acquire methods or need to be resolved prior to launching work. The lack of flexible and powerful work scheduling capabilities prevents many complex algorithms from being run on the powerful computation resources of the GPU.

SUMMARY OF THE INVENTION

Embodiments of the present invention implement a high-performance GPU task scheduling method that efficiently utilizes the hardware computational resources of a GPU.

In one embodiment, the present invention comprises a computer implemented method for scheduling work for processing by a GPU. The method includes accessing a work completion data structure and accessing a work tracking data structure. Dependency logic analysis is then performed using work completion data and work tracking data. Work items that have all dependencies satisfied are then launched into the GPU by using a software work item launch interface.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
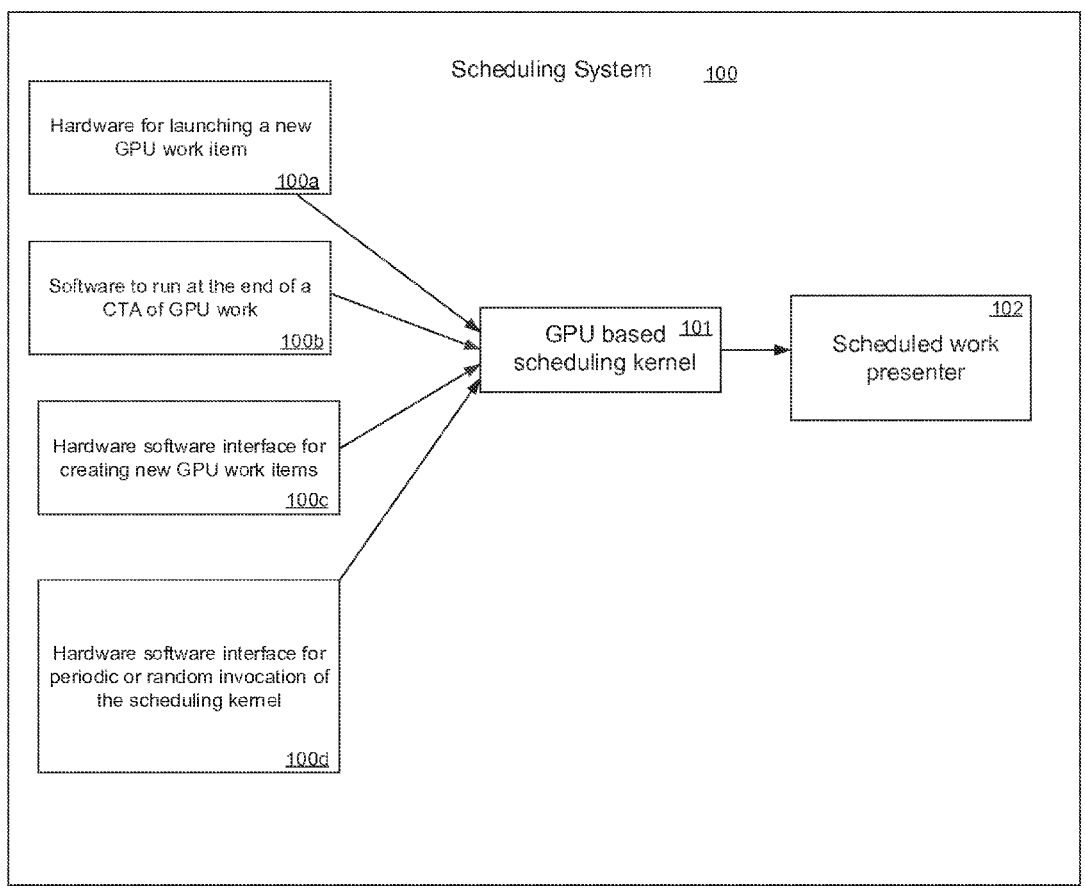
FIG. 1 shows a scheduling system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of non-transitory electrical or magnetic signals capable of being stored, transferred, combined, compared, and otherwise manipulated in a computer readable storage medium of a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention comprise a method and system for making high-level scheduling decisions for GPU work items created through, for example, GPU work creation. Embodiments of the present invention can be described as a software-based scheduling kernel. The scheduling kernel schedules work items based on the properties of the computer system, such as, task-to-task dependencies and task priorities. It should be noted that there is a difference between creating tasks and launching tasks. Many different threads executing on the GPU or the CPU can create tasks that may or may not be ready to be immediately launched onto the GPU. The scheduler kernel comprises code that is responsible for finding created (or extant) tasks that are ready to run and launching them. The operation of the scheduler kernel is distinct from the various methods that are used to launch/start the scheduler kernel.

FIG. 1 shows a scheduling system 100 in accordance with one embodiment of the present invention. As depicted in FIG. 1, the scheduling system 100 includes a GPU-based scheduling kernel 101 and a scheduled work presenter 102. FIG. 1 also shows components 100a-100d, which illustrate four different methods by which the scheduling kernel is started, which are described in greater detail below. The scheduling kernel 101 component is configured to be run on the GPU to make scheduling decisions. This software scheduling algorithm is by nature adaptable to the capabilities desired in the system. The scheduled work presenter 102 comprises a hardware mechanism for presenting scheduled work as available to be run by the GPU.

As referred to herein, a TMD is a Task Meta Data structure, which encapsulates and describes a work item or task to be processed by the GPU. In one implementation, the TMD contains a description of state necessary to run the task. The TMD can be decomposed into a group of CTAs (Cooperative Thread Array) that can be run in parallel on an array of execution processors, shader multiprocessors, or the like. A collection of CTAs can comprise a grid of cooperative threads that can run in parallel on the array.

This system 100 may be one or more of the following, all of which are described in greater detail below.

a.) Hardware for launching a new GPU work item whenever a prior GPU work item on which it depends is completed. This is known as the dependent TMD launch.

b.) Software to be run at the end of a CTA of GPU work. This is known as an At-Exit Scheduling Kernel.

c.) A hardware/software interface for creating new GPU work items, either via a command buffer or via a TMD launch interface. This is known as GPU Scheduling Kernel Creation.

d.) A hardware/software interface to specify the periodic or random invocation of the Scheduling Kernel. This is known as a Time-Slice-Based Scheduling Kernel.

Figure 2:
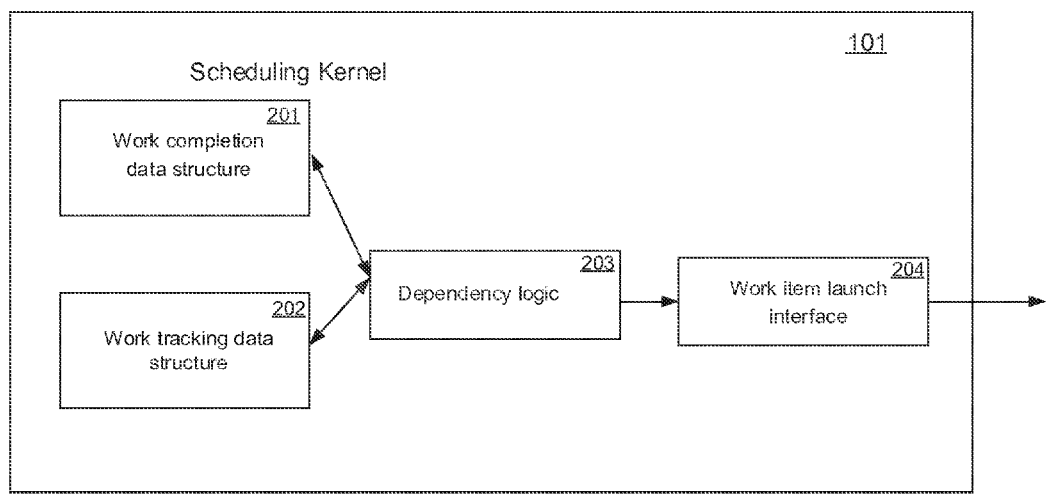
FIG. 2 shows a diagram depicting internal components of the scheduling kernel in accordance with one embodiment of the present invention.

FIG. 2 shows a diagram depicting internal components of the scheduling kernel 101 in accordance with one embodiment of the present invention. The scheduling kernel 101 functions by addressing the problem of resolving work dependencies. In the FIG. 2 embodiment, the scheduling kernel is comprised of a software component, run on the GPU, that manages dependencies between GPU work items (e.g., TMDs), and launches GPU work items whose dependencies are satisfied. Because the scheduling kernel is software, it is mutable and can be changed to meet application-specific requirements. This makes it a very flexible alternative to a hardware-based solution, as the scheduling kernel can change over time to meet software requirements on the same hardware. For example, a driver update can include a new version of the scheduling kernel that is changed to expose new capabilities or improve performance.

Referring still to FIG. 2, the scheduling kernel 101 includes a work completion data structure 201 that functions by tracking the completion of work items, a work tracking data structure 202 that tracks outstanding, to-be-run work items and their dependencies, dependency logic 203 for determining when to launch work items that have all of their dependencies satisfied, and a software interface for launching GPU work items.

Figure 3:
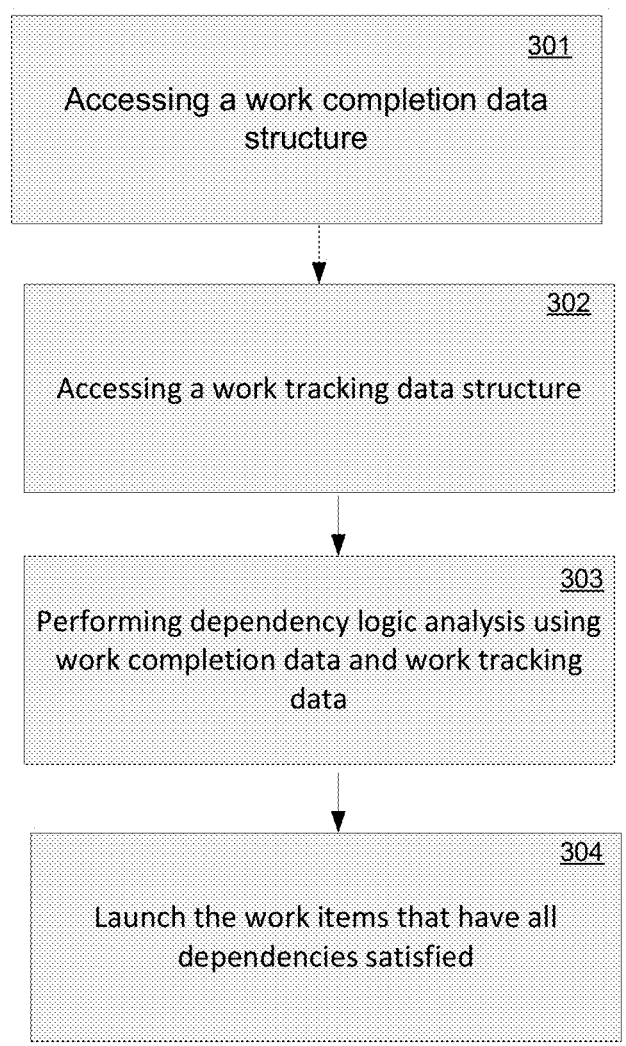
FIG. 3 shows a flowchart of scheduling process as implemented by a scheduling kernel in accordance with one embodiment of the present invention.

FIG. 3 shows a flowchart of scheduling process 300 as implemented by a scheduling kernel in accordance with one embodiment of the present invention.

Process 300 begins in step 301, wherein the scheduling kernel accesses a work completion data structure. As described above, the work completion data structure tracks the completion of work items. In step 302, the scheduling kernel accesses a work tracking data structure. As described above, the work tracking data structure tracks outstanding, to-be-run work items and their dependencies. In step 303, the scheduling kernel analyzes the data from the work-completion and work-tracking data structures and determines/enumerates dependencies between the tasks tracked thereby. The dependency logic determines when to launch work items. As used herein, a work item is ready for launch when it has no dependencies for which it is waiting, and can be launched even though other work items may, or may not, depend on it. In step 304, work items on which other tasks may or may not depend are launched into the GPU using a software launch interface.

Launching the Scheduling Kernel

Because the scheduling kernel is itself a GPU work item, it must be invoked in order to perform its scheduling function. There are several different methods by which the scheduling kernel may be invoked, which may be used alone or in combination: (a) dependent TMD launch, (b) at-exit scheduling kernel, (c) GPU Scheduling Kernel Creation and (d) Time-Slice-Based Scheduling Kernel. Each will be described below in greater detail.

Method 1: Dependent TMD Launch

In one embodiment, GPU work items are expressed as Task Meta Data (TMD) structures, as described above. TMDs are tracked by hardware through the GPU pipeline, and the hardware knows that a TMD has been completed, for example, when a grid of GPU work has finished executing. At TMD completion time, the TMD management HW can perform functions such as semaphore release operations and memory barriers.

In one embodiment, the TMD management hardware includes a new mechanism to perform a launch through the hardware launch interface at TMD completion. The details of the dependent launch operation are programmed into the TMD at its creation. Each TMD is programmed to launch the scheduling kernel at completion, so the scheduling kernel is invoked every time a GPU work item is completed. In this manner, the scheduling kernel can be configured to launch in response to the completion of a GPU task, at which point the scheduling kernel may make a scheduling decision based on which task completed.

Method 2: At-Exit Scheduling Kernel

Because the scheduling kernel is GPU software, it can be run in the same CTA as a user program. An at-exit scheduling kernel can be appended to the end of a user program by either the compiler at compile time or by system software at program load time. In either case, it is then executed as part of each user-launched CTA, just prior to that CTA's completion.

The at-exit scheduling kernel has the advantage of being run once per CTA. This allows the scheduling kernel to track the completion of individual CTAs, instead of a collection of CTAs that may make up a GPU work item, as expressed by a TMD. This may be beneficial in cases in which HW cannot know when a task is complete (e.g., it has dependencies for completion that aren't tracked within the TMD itself). In such cases, the at-exit scheduling kernel enables the software to accurately identify the completion of the task (e.g., by identifying the completion of the last CTA associated with the task), at which point the appropriate scheduling decision can be made.

It should be noted, however, that due to being invoked once per CTA, the at-exit scheduling kernel may incur high overheads. While the overhead of running the scheduling kernel is amortized over the runtime of the whole GPU work item in the Dependent TMD Launch method, the at-exit scheduling kernel overhead is only amortized over the runtime of the CTA. This additional overhead is acceptable in cases in which the scheduler must run at per-CTA granularity in order to accurately manage dependencies, but otherwise, Method 1 may generally be preferred for performance.

Method 3: GPU Scheduling Kernel Creation

In one exemplary embodiment, a GPU Work Creation (GWC) feature is implemented that allows new GPU work items to be dynamically created by the GPU itself. Because the scheduling kernel can itself be a GPU work item, software running on the GPU could then use this new functionality to launch the scheduling kernel at any time. This capability allows GPU software to implement runtimes that invoke the scheduling kernel at specified points, or even allow a user to invoke the scheduling kernel from within an application. This flexibility allows the GPU scheduling kernel to be customized to individual applications and algorithms. The scheduling kernel can be configured to launch in response to a software command of an application executing on the GPU independently.

Method 4: Time-Slice-Based Scheduling Kernel (Time-Slice-Based Launching)

As a fourth option, the scheduling kernel might be automatically invoked after a certain amount of time, known as a time slice. The time slice specifies the time period between each invocation of the scheduling kernel, and is configurable, allowing software to balance the run time of the scheduling kernel with the run time of user code. In this manner, the scheduling kernel can be configured to launch in response to a time slice.

The time slice could be implemented by any of several mechanisms: A hardware unit that counts the time slice and launches a TMD when the time slice expires; a periodic timer interrupt that informs the CPU to launch an instance of the scheduling kernel; or a periodic timer interrupt that forces the GPU to enter its trap handler. Combined with GPU work creation features, the GPU could then launch the scheduling kernel itself.

It should be noted that a disadvantage of using a time slice-based scheduling kernel is that the GPU may complete all of its work prior to the time slice's lapse, leaving the GPU unutilized until the time slice expires. Hardware or software to detect this condition can be implemented.

Exemplary Scheduling Kernel Implementation

In one embodiment, dynamic parallelism allows a GPU thread to launch a new GPU work item, wait on the latter to complete, and then use the results. In order to successfully wait on the created work items, the CTA of the parent thread may need to facilitate the execution of its children by removing itself from the GPU, to be rescheduled as a continuation after all outstanding work items have completed. For dynamic parallelism, the scheduling kernel is invoked in two situations, as described below.

In the first situation, every time a grid of work completes, the scheduling kernel is launched via a dependent TMD launch as described above. The grid records its completion by using an atomic operation to set a bit in a packed array representing grid identifiers. When the scheduling kernel runs, it uses the GPU's SIMD and specialized bit-scan instructions to read the array and find the identifier of the grid that completed. The completed grid identifier then is used to find dependent work in a data structure. Once found, any dependent work is launched using GWC features.

In the second situation, every time a continuation of a CTA completes, the scheduling kernel is run via the at-exit scheduling kernel. The scheduling kernel is able to determine which continuation is completing via an internal data structure. The completed continuation data structure is used to find dependent work and then GWC features are used to launch the work.

Figure 4:
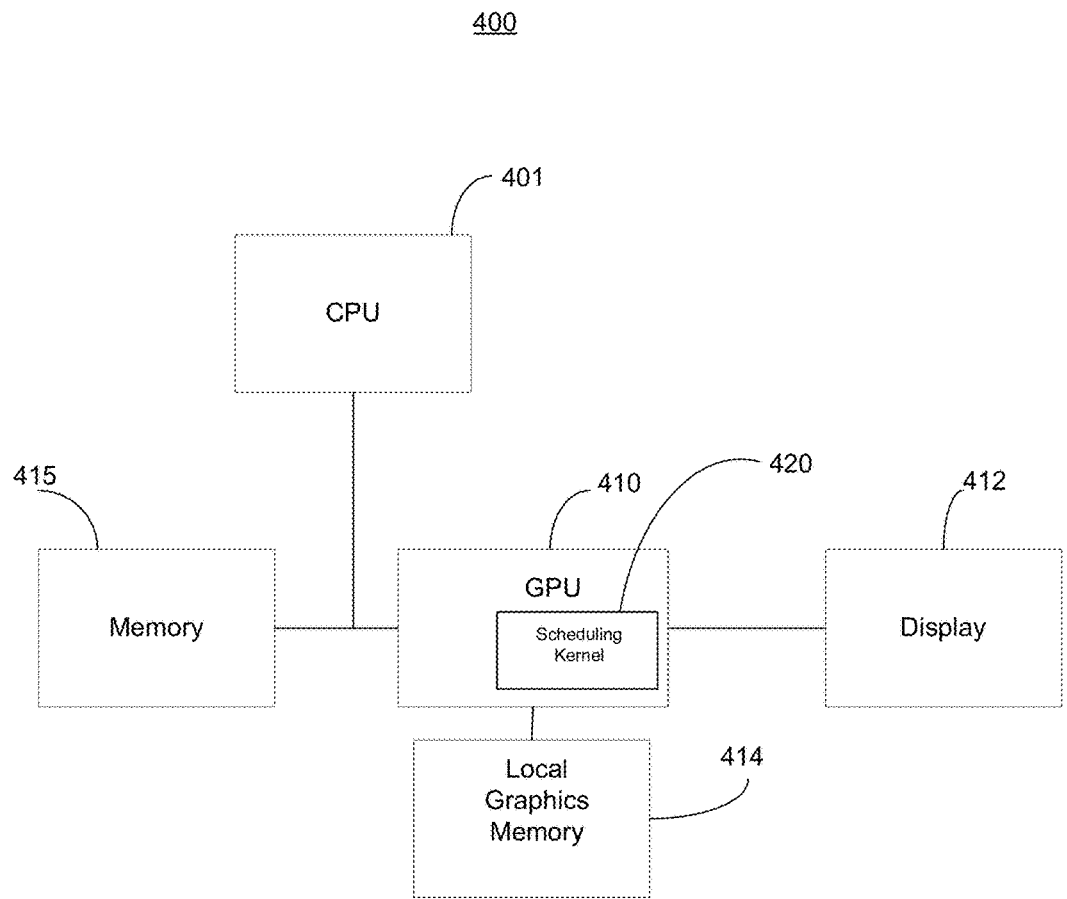
FIG. 4 shows a computer system in accordance with one embodiment of the present invention.

Computer System Platform:

FIG. 4 shows a computer system 400 in accordance with one embodiment of the present invention. Computer system 400 depicts the components of a basic computer system in accordance with embodiments of the present invention providing the execution platform for certain hardware-based and software-based functionality. In general, computer system 400 comprises at least one CPU 401, a system memory 415, and at least one graphics processor unit (GPU) 410. The CPU 401 can be coupled to the system memory 415 via a bridge component/memory controller (not shown) or can be directly coupled to the system memory 415 via a memory controller (not shown) internal to the CPU 401. The GPU 410 is coupled to a display 412. The GPU 410 is shown including an allocation/de-allocation component 420 for just-in-time register allocation for a multithreaded processor. A register file 427 and an exemplary one of the plurality of registers (e.g., register 425) comprising the register file is also shown within the GPU 410. One or more additional GPUs can optionally be coupled to system 400 to further increase its computational power. The GPU(s) 410 is coupled to the CPU 401 and the system memory 415. System 400 can be implemented as, for example, a desktop computer system or server computer system, having a powerful general-purpose CPU 401 coupled to a dedicated graphics rendering GPU 410. In such an embodiment, components can be included that add peripheral buses, specialized graphics memory, IO devices, and the like. Similarly, system 400 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 410 can be implemented as a discrete component, a discrete graphics card designed to couple to the computer system 400 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 414 can be included for the GPU 410 for high bandwidth graphics data storage.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for scheduling work for processing by a GPU, comprising:
    tracking, by a scheduling kernel executing in the GPU, completed work items of a plurality of work items through a GPU pipeline in a work completion data structure comprised in the scheduling kernel;
    tracking, by the scheduling kernel, pending work items of the plurality of work items and a plurality of dependencies corresponding to the pending work items through the GPU pipeline in a work tracking data structure comprised in the scheduling kernel;
    performing dependency logic analysis based on the work completion data and the work tracking data structures to determine when all dependencies corresponding to a first pending work item are satisfied; and
    launching the first pending work item into the GPU by using a software work item launch interface when all dependencies corresponding to the first pending work item are satisfied,
    wherein the tracking the completed and pending work items and the plurality of dependencies corresponding to the pending work items is performed by GPU hardware.

2. The method of claim 1, wherein the tracking pending work items of the plurality of work items comprises accessing the work completion data structure in the GPU.

3. The method of claim 1, wherein the tracking pending work items of the plurality of work items and a plurality of dependencies corresponding to the pending work items comprises accessing the work tracking data structure in the GPU.

4. The method of claim 1, wherein the performing the dependency logic analysis comprises managing dependencies between a plurality of GPU work items, and launches a selected GPU work item whose dependencies are satisfied.

5. The method of claim 1, wherein the plurality of work items are represented as a plurality of Task Meta Data (TMD) structures, each TMD corresponding to a work item and comprising a description of a state necessary to execute the work item.

6. The method of claim 5, wherein the launching the first work item is performed in response to receiving a GPU command, and wherein the GPU corresponding to a completion of a prior task.

7. The method of claim 5, further comprising launching the scheduling kernel in response to receiving a software command of an application executing on the GPU corresponding to a completion of a prior task.

8. The method of claim 5, further comprising launching the scheduling kernel in response to a software command of an application executing on the GPU independently.

9. The method of claim 5, further comprising launching the scheduling kernel in response to a time slice.

10. The method of claim 1, wherein the dependency logic analysis is performed by the GPU.

11. The method of claim 1, wherein at least one of the work completion data structure and the work tracking data structure comprises a description of a state necessary to perform the a work item of the plurality of work items.

12. The method of claim 1, wherein performing dependency logic analysis comprises analyzing the work completion and the work tracking data structures to determine dependencies of the plurality of dependencies for a first pending work item.

13. The method of claim 1, wherein the performing dependency logic analysis comprises analyzing data from the work completion and work tracking data structures in the scheduling kernel to determine dependencies between work items in the plurality of work items.

14. A non-transitory computer readable storage medium having stored thereon, computer executable instructions that, if executed by a computer system cause the computer system to perform a method for scheduling work for processing by a GPU, comprising:
    tracking, by a scheduling kernel executing in the GPU, completed work items of a plurality of work items through a GPU pipeline in a work completion data structure comprised in a scheduling kernel;
    tracking, by the scheduling kernel, pending work items of the plurality of work items and a plurality of dependencies corresponding to the pending work items through the GPU pipeline in a work tracking data structure comprised in the scheduling kernel;
    performing dependency logic analysis based on the work completion data and the work tracking data structures to determine when all dependencies corresponding to a first pending work item are satisfied; and
    launching the first pending work item into the GPU by using a software work item launch interface when all dependencies corresponding to the first pending work item are satisfied,
    wherein the tracking the completed and pending work items and the plurality of dependencies corresponding to the pending work items is performed by GPU hardware.

15. The non-transitory computer readable storage medium of claim 14, wherein the performing the dependency logic analysis comprises managing dependencies between the plurality of work items.

16. The non-transitory computer readable storage medium of claim 14, wherein the plurality of work items are represented as a plurality of Task Meta Data (TMD) structures, each TMD corresponding to a work item and comprising a description of a state necessary to execute the work item.

17. The non-transitory computer readable storage medium of claim 16, further comprising launching the scheduling kernel in response to a GPU command corresponding to a completion of a prior task.

18. The non-transitory computer readable storage medium of claim 16, further comprising launching the scheduling kernel in response to a software command of an application executing on the GPU corresponding to a completion of a prior task.

19. The non-transitory computer readable storage medium of claim 16, further comprising launching the scheduling kernel in response to a software command of an application executing on the GPU independently.

20. The non-transitory computer readable storage medium of claim 16, further comprising launching the scheduling kernel in response to a time slice.

21. The non-transitory computer readable storage medium of claim 14, wherein the performing dependency logic analysis comprises analyzing data from the work completion and work tracking data structures in the scheduling kernel to determine dependencies between work items in the plurality of work items.

22. A computer system, comprising:
a computer system having a processor and a GPU coupled to a computer readable storage media and executing computer readable code which causes the computer system to:
track completed work items of a plurality of work items through a GPU pipeline in a work completion data structure comprised in a scheduling kernel executing in the GPU;
track pending work items of the plurality of work items and a plurality of dependencies corresponding to the pending work items through the GPU pipeline in a work tracking data structure comprised the a scheduling kernel;
perform dependency logic work completion data and the work tracking data structures to determine when all dependencies corresponding to a first pending work item are satisfied and when to launch the first pending work item; and
launch the first pending work item into the GPU by using a software work item launch interface when all dependencies corresponding to the first pending work item are satisfied,
further wherein, the completed and pending work items and the plurality of dependencies corresponding to the pending work items are tracked by GPU hardware.

23. The computer system of claim 22, wherein the scheduling kernel is configured to launch in response to a GPU command, and wherein the GPU launches the scheduling kernel upon completion of a prior task.

24. The computer system of claim 22, wherein the scheduling kernel is configured to launch in response to a software command of an application executing on the GPU, and wherein the GPU launches the scheduling kernel upon completion of a prior task.

25. The computer system of claim 22, wherein the scheduling kernel is configured to launch in response to a software command of an application executing on the GPU independently.

26. The computer system of claim 22, wherein the performing dependency logic analysis comprises analyzing data from the work completion and work tracking data structures in the scheduling kernel to determine dependencies between work items in the plurality of work items.

* * * * *